US 9,913,262 B2

(12) United States Patent
Takeda et al.

(10) Patent No.: US 9,913,262 B2
(45) Date of Patent: Mar. 6, 2018

(54) RADIO COMMUNICATION SYSTEM, USER TERMINAL AND RADIO COMMUNICATION METHOD

(71) Applicant: NTT DOCOMO, INC., Tokyo (JP)

(72) Inventors: Kazuaki Takeda, Tokyo (JP); Tooru Uchino, Tokyo (JP); Yuta Sagae, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 294 days.

(21) Appl. No.: 14/435,911

(22) PCT Filed: Oct. 28, 2013

(86) PCT No.: PCT/JP2013/079066
§ 371 (c)(1),
(2) Date: Apr. 15, 2015

(87) PCT Pub. No.: WO2014/069382
PCT Pub. Date: May 8, 2014

(65) Prior Publication Data
US 2015/0296487 A1    Oct. 15, 2015

(30) Foreign Application Priority Data
Nov. 2, 2012   (JP) ................................. 2012-243078

(51) Int. Cl.
*H04W 72/04* (2009.01)
*H04W 24/08* (2009.01)
(Continued)

(52) U.S. Cl.
CPC ......... *H04W 72/042* (2013.01); *H04L 5/0048* (2013.01); *H04W 24/08* (2013.01);
(Continued)

(58) Field of Classification Search
CPC .......................... H04W 72/042; H04W 24/08
See application file for complete search history.

(56) References Cited

U.S. PATENT DOCUMENTS

2010/0113008 A1 * 5/2010 Wang ....................... H04L 1/20
                                                              455/423
2012/0106465 A1   5/2012 Haghighat et al.
(Continued)

FOREIGN PATENT DOCUMENTS

JP        2007195076 A    8/2007

OTHER PUBLICATIONS

Office Action issued in corresponding Japanese Application No. 2012-243078, dated Nov. 22, 2016 (8 pages).
(Continued)

*Primary Examiner* — Saba Tsegaye
(74) *Attorney, Agent, or Firm* — Osha Liang LLP

(57) ABSTRACT

The present invention is designed to provide a radio communication system, a user terminal and a radio communication method that make it possible to monitor communication quality adequately even when a new radio resource structure is employed. A radio communication system is provided, which transmits downlink control information from a radio base station to a user terminal by using an enhanced downlink control channel that is frequency-division-multiplexed with a downlink shared data channel, and which also monitors downlink quality based on the received quality of downlink reference signals that are transmitted from the radio base station to the user terminal, and, in this radio communication system, the user terminal determines radio link failures by comparing the received quality of the downlink reference signals transmitted from the radio base station, against one or both of first criteria, which are constituted of two thresholds that correspond to predetermined block error rates of a downlink control channel, and
(Continued)

second criteria, which are constituted of two thresholds that are different from the two thresholds of the first criteria.

9 Claims, 14 Drawing Sheets

(51) Int. Cl.
H04L 5/00 (2006.01)
H04W 36/00 (2009.01)
H04W 72/08 (2009.01)
H04W 88/02 (2009.01)
H04W 88/08 (2009.01)

(52) U.S. Cl.
CPC ....... *H04W 36/0055* (2013.01); *H04W 72/08* (2013.01); *H04W 88/02* (2013.01); *H04W 88/08* (2013.01)

(56) References Cited

U.S. PATENT DOCUMENTS

| | | | | |
|---|---|---|---|---|
| 2013/0039284 A1* | 2/2013 | Marinier | ................. | H04L 5/001 370/329 |
| 2013/0064216 A1* | 3/2013 | Gao | ...................... | H04L 5/0016 370/330 |
| 2013/0315157 A1* | 11/2013 | Krishnamurthy | ..... | H04L 5/0053 370/329 |
| 2014/0098754 A1* | 4/2014 | Luo | ...................... | H04L 5/0053 370/329 |

OTHER PUBLICATIONS

Samsung; "Component carrier failure and radio link failure"; 3GPP TSG RAN WG2#69, R2-101041; San Francisco, USA; Feb. 22-26, 2010 (3 pages).

3GPP TR 25.913 V8.0.0; 3rd Generation Partnership Project; Technical Specification Group Radio Access Network; Requirements for Evolved UTRA (E-UTRA) and Evolved UTRAN (E-UTRAN) (Release 8); Dec. 2008 (18 pages).

International Search Report for corresponding International Application No. PCT/JP2013/079066, dated Jan. 14, 2014 (1 page).

Extended European Search Report issued in corresponding European Application No. 13851348.6, dated Jun. 9, 2016 (8 pages).

MediaTek Inc.; "CoMP measurement reporting"; 3GPP TSG-RAN WG1 Meeting #68bis, R1-121181; Jeju, South Korea; Mar. 26-30, 2012 (4 pages).

* cited by examiner

***EPDCCH-Config* information elements**

```
-- ASN1START

EPDCCH-Config-r11 ::=       CHOICE {
    release                     NULL,
    setup                       SEQUENCE {
        subframePattern-r11         BIT STRING (SIZE(FFS)),         - FFS on the value type and the
need of separate IE for TDD
        resourceConfigList-r11      SEQUENCE (SIZE (1..FFS)) OF EPDCCH-ResourceConfig-r11
        rlmResource-r11             ENUMERATED {epdcch}                 OPTIONAL, -- Need OR
        rlmPeriodCoeff-r11          ENUMERATED {n1.2, n1.4, n1.6, n1.8,
                                        n2, spare1, spare2, spare3}     OPTIONAL -- Need OR
}

EPDCCH-ResourceConfig-r11 ::=           SEQUENCE {
    resourceAllocationType-r11              ENUMERATED {localized, distributed}, - FFS on other values
    resourceBlockAssignment-r11             CHOICE {
        nrb6-r11                                BIT STRING (SIZE(FFS)),         - FFS on the value
type
        nrb15-r11                               BIT STRING (SIZE(FFS)),
        nrb25-r11                               BIT STRING (SIZE(FFS)),
        nrb50-r11                               BIT STRING (SIZE(FFS)),
        nrb75-r11                               BIT STRING (SIZE(FFS)),
        nrb100-r11                              BIT STRING (SIZE(FFS))
    },
    pucch-Start-r11                         INTEGER (1..FFS),       - FFS on other information
}

-- ASN1STOP
```

***EPDCCH-Config* field descriptions**

*rlmResource*
This field indicates whether radio link quality is monitored by ePDCCH in the subframes indicated by *resourceConfigList* defined in TS 36.133. Otherwise, it is monitored by PDCCH in the subframes not indicated by *resourceConfigList* defined in TS 36.133

*rlmPeriodCoeff*
Actual radio link monitoring period, expressed in *rlmPeriodCoeff* the value defined in 7.6.2 of TS 36.133*. n1.2 corresponds to value 1.2, n1.4 corresponds to value 1.4, and so on.

FIG.6

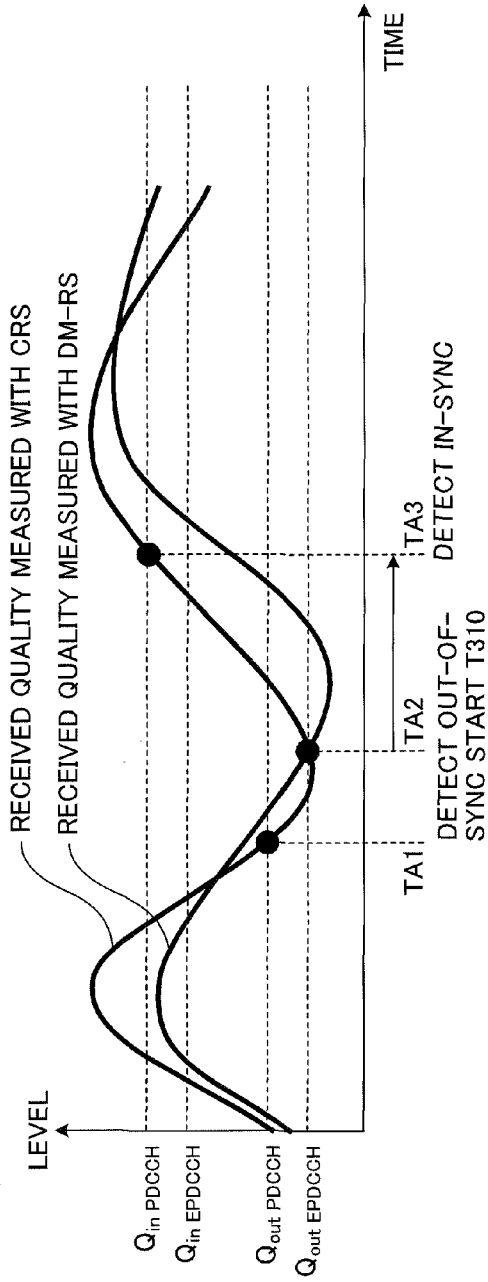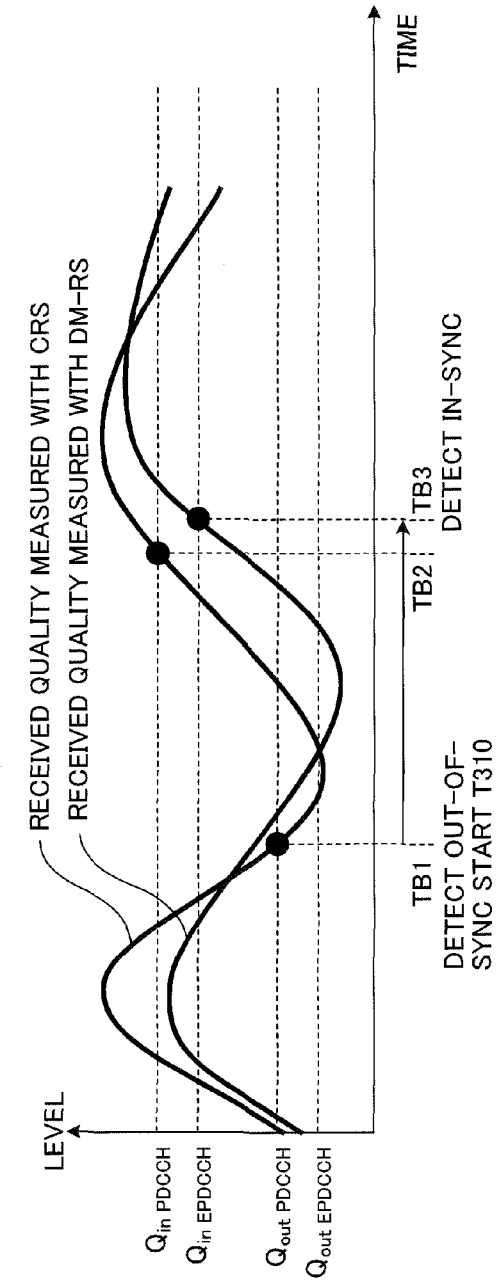

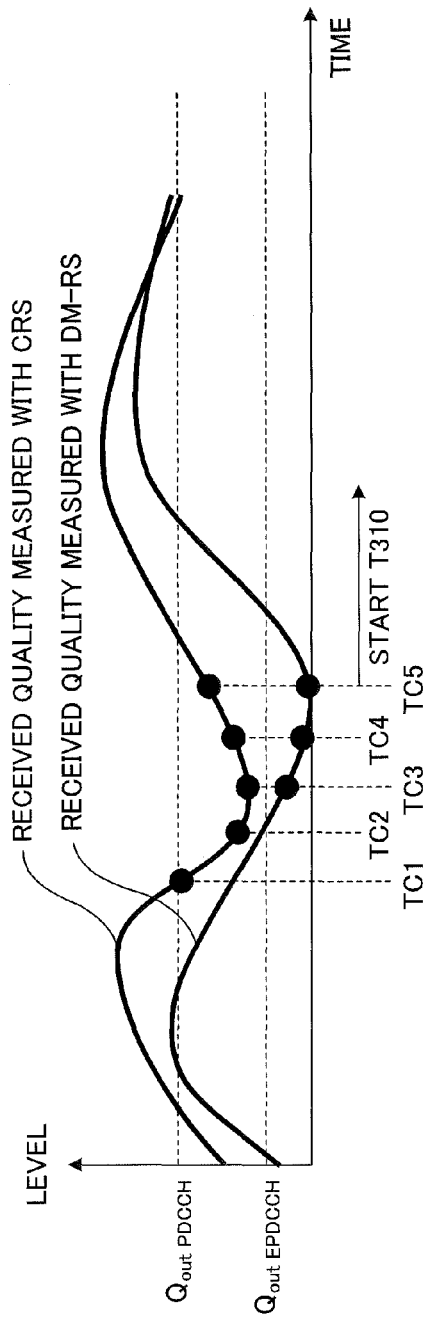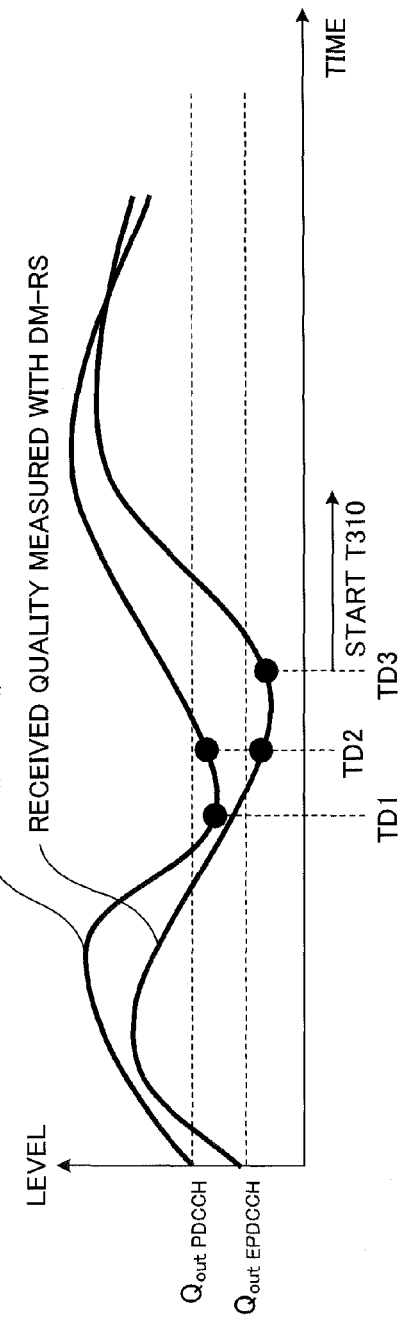
FIG.8A
FIG.8B

RADIO COMMUNICATION SYSTEM, USER TERMINAL AND RADIO COMMUNICATION METHOD

CROSS REFERENCE TO RELATED APPLICATIONS

The disclosure of Japanese Patent Application No. 2012-243078, filed on Nov. 2, 2012, including the specification, drawings and 20 abstract, is incorporated herein by reference in its entirety.

TECHNICAL FIELD

The present invention relates to a radio communication system, a user terminal and a radio communication method.

BACKGROUND ART

The specifications of long-term evolution (LTE) have been developed for the purpose of achieving increased speed, lower delay and so on in UMTS (Universal Mobile Telecommunications System) (non-patent literature 1). In LTE, a communication scheme that is based on OFDMA (Orthogonal Frequency Division Multiple Access) is used in downlink channels (downlink), and a communication scheme that is based on SC-FDMA (Single Carrier Frequency Division Multiple Access) is used in uplink channels (uplink).

Successor standards of LTE (referred to as "LTE-advanced" ("LTE-A") and so on) are under study for the purpose of achieving further broadbandization and increased speed. LTE-A is planned to employ a new transmission scheme such as multiple-user MIMO (MU-MIMO), which transmits information from different transmitting antennas to different user terminals, simultaneously.

When a new transmission scheme such as the above one is employed, there is a threat that the capacity of the downlink control channel (PDCCH: Physical Downlink Control CHannel) to transmit downlink control information (DCI) runs short and the characteristics of the LTE-A system cannot be optimized. So, in LTE-A, a study is in progress to employ a new radio resource structure that expands the radio resource region for DCI.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

In LTE and LTE-A, radio link monitoring (RLM) for monitoring downlink quality based on the received quality of downlink reference signals such as CRSs (Cell-specific Reference Signals) is employed. In RLM, a decrease in the received quality of downlink reference signals is associated with a radio link failure (RLF), and seen as a trigger for various kinds of processes for recovery. However, since RLM is optimized for conventional radio resource structures, there is a threat that, if a new radio resource structure such as the one described above is employed, downlink quality cannot be monitored adequately.

The present invention has been made in view of the above, and it is therefore an object of the present invention to provide a radio communication system, a user terminal and a radio communication method that can monitor downlink quality adequately even when a new radio resource structure is employed.

Solution to Problem

The radio communication system of the present invention is a radio communication system, which transmits downlink control information from a radio base station to a user terminal by using an enhanced downlink control channel that is frequency-division-multiplexed with a downlink shared data channel, and which also monitors downlink quality based on received quality of a downlink reference signal that is transmitted from the radio base station to the user terminal, and, in this radio communication system, the radio base station has a transmitting section that transmits the downlink reference signal to the user terminal, the user terminal has a measurement section that measures received quality of the downlink reference signal transmitted from the radio base station, and a determining section that determines a radio link failure on downlink based on the received quality of the downlink reference signal, and the determining section determines the radio link failure by comparing the received quality of the downlink reference signal against one or both of first criteria that are constituted of two thresholds corresponding to predetermined block error rates of a downlink control channel, and second criteria that are constituted of two thresholds that are different from the two thresholds of the first criteria.

Technical Advantage of the Invention

According to the present invention, it is possible to provide a radio communication system, a user terminal and a radio communication method that can monitor downlink quality adequately even when a new radio resource structure is employed.

BRIEF DESCRIPTION OF THE DRAWINGS

FIG. 6 is a diagram to show examples of enhanced PDCCH information elements;

FIG. 7 provides schematic diagrams to explain the radio link monitoring according to a fourth example;

FIG. 8 provides schematic diagrams to explain examples of variations of the radio link monitoring according to the fourth example;

DESCRIPTION OF EMBODIMENTS

Figure 1:
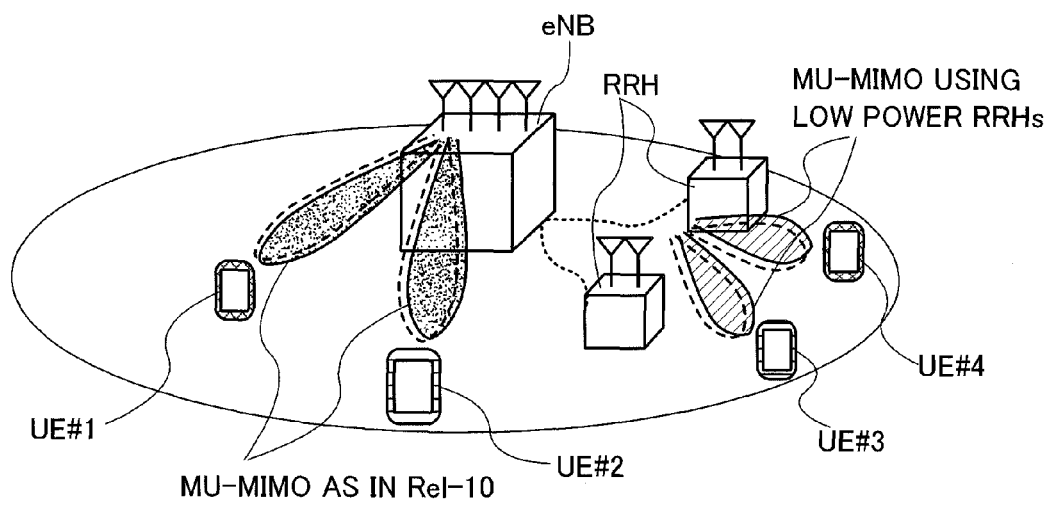
FIG. 1 is a schematic diagram to show an example structure of a radio communication system where multiple-user MIMO is employed.

FIG. 1 is a schematic diagram to show an example structure of a radio communication system where multiple-user MIMO (MU-MIMO) is employed. The system shown in FIG. 1 is structured in layers by providing small radio base stations (for example, RRHs (Remote Radio Heads)) having local coverage areas within the coverage area of a radio base station (for example, an eNB: eNodeB). In this radio communication system, data for a plurality of user terminals UE (User Equipment) (here, UE #1 and UE #2) is transmitted at the same time from a plurality of antennas of the radio base station eNB. Data for a plurality of user terminals UE (here, UE #3 and UE #4) is transmitted at the same time from a plurality of antennas of a plurality of small radio base stations RRH.

Figure 2:
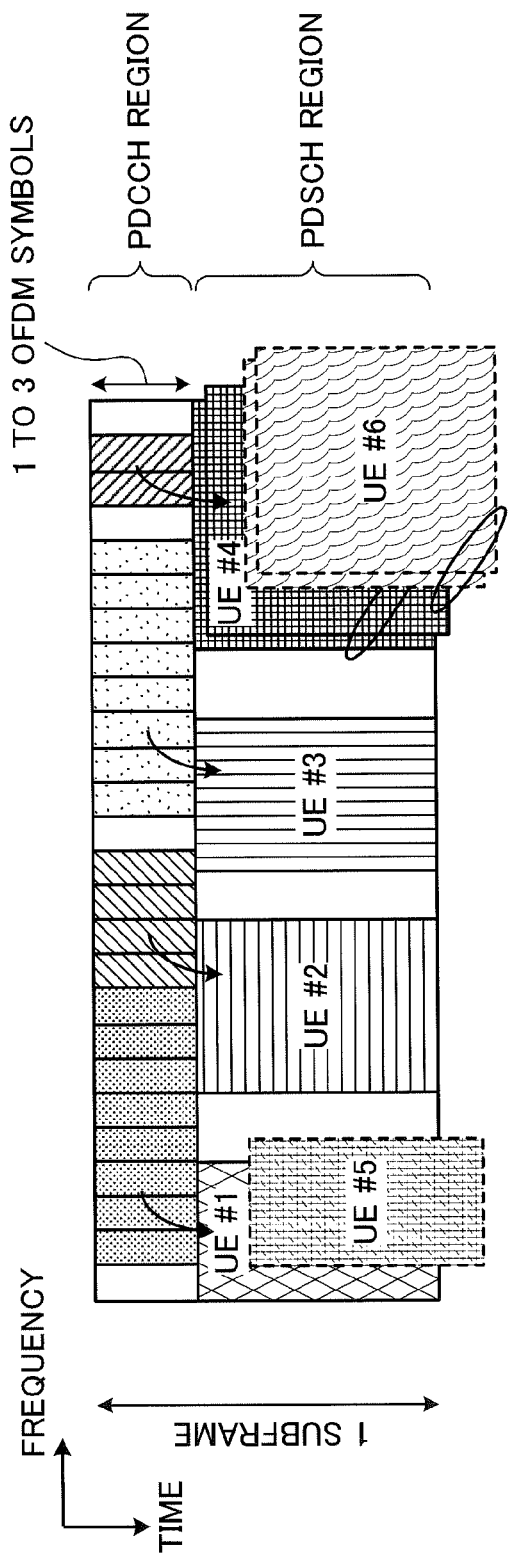
FIG. 2 is a schematic diagram to show an example structure of radio resources where downlink MU-MIMO is employed.

FIG. 2 is a schematic diagram to show an example structure of radio resources (for example, one subframe) where downlink MU-MIMO is employed. As shown in FIG. 2, a predetermined number of OFDM symbols (maximum three OFDM symbols) from the top of each subframe are secured as a radio resource region (PDCCH region) for a downlink control channel (PDCCH: Physical Downlink Control CHannel). The radio resource region following the predetermined number of symbols from the subframe top serve as a radio resource region (PDSCH region) for a downlink shared data channel (PDSCH: Physical Downlink Shared CHannel).

In the PDCCH region, downlink control information (DCI) for user terminals UE (here, UE #1 to UE #4) is allocated. The DCI includes allocation information of data for the user terminals UE in the PDSCH region, and/or the like. For example, in FIG. 2, user terminal UE #2 receives the data for user terminal UE #2 that is allocated to the PDSCH region, based on the DCI for user terminal UE #2 that is allocated to the PDCCH region.

In MU-MIMO, it is possible to transmit data for a plurality of user terminals UE in the same time and in the same frequency. For example, in FIG. 2, data for user terminal UE #1 and data for user terminal UE #5 are multiplexed over the same time and the same frequency in the PDSCH region. Similarly, data for user terminal UE #4 and data for user terminal UE #6 are multiplexed over the same time and the same frequency in the PDSCH region.

However, if the number of user terminals UE to have data multiplexed in the PDSCH region increases, cases might occur where DCI for all of the user terminals UE (here, UE #1 to UE #6) cannot be allocated in the PDCCH region. For example, in the PDCCH region of FIG. 2, the DCI for user terminals UE #5 and UE #6 cannot be allocated. In this way, when the PDCCH region for allocating DCI runs short, the number of user terminals UE that can receive the data allocated to the PDSCH region is limited, and therefore it becomes not possible to sufficiently improve the efficiency of use of radio resources.

Figure 3A:
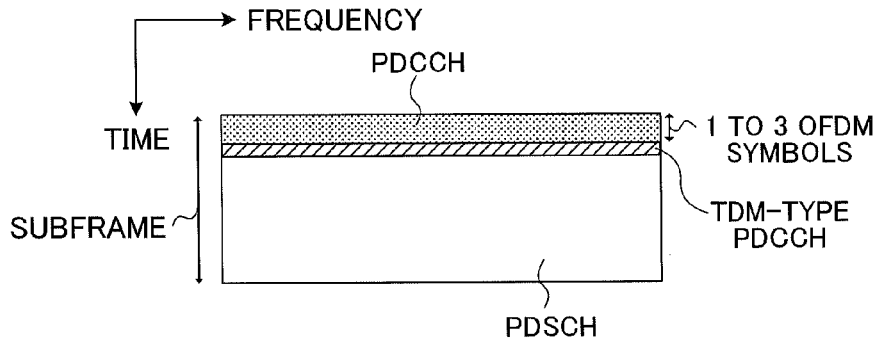
FIG. 3 provides schematic diagrams to show example structures of radio resources where an enhanced PDCCH is configured.

As a method of providing a solution to such shortage of the PDCCH region, it may be possible to expand the region for allocating DCI outside the region that is maximum three OFDM symbols from the top of a subframe (that is, expand the PDCCH region into the conventional PDSCH region, which is from the fourth OFDM symbol onward). As for the method of expanding the PDCCH region, a method of time-division-multiplexing the PDSCH and the PDCCH in the conventional PDSCH region as shown in FIG. 3A (TDM approach) is possible. In the TDM approach shown in FIG. 3A, the PDCCH is placed over the entire system band in part of the OFDM symbols from the fourth OFDM symbol onward in the subframe.

Figure 3B:
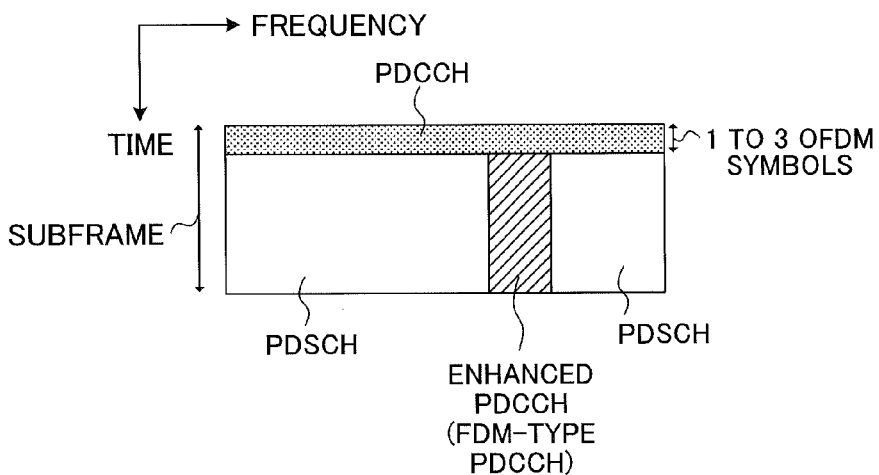

As shown in FIG. 3B, a method of frequency-division-multiplexing the PDSCH and the PDCCH in the conventional PDSCH region is also possible (FDM approach). In the FDM approach shown in FIG. 3B, the PDCCH can be placed in part of the system band in all the OFDM symbols from the fourth OFDM symbol onward in the subframe. The PDCCH that is frequency-division-multiplexed with the PDSCH in the FDM approach is demodulated using demodulation reference signals (DM-RSs), which are user-specific reference signals. Consequently, DCI that is transmitted in this PDCCH can achieve beam-forming gain, like downlink data that is transmitted in the PDSCH does, and this is effective to increase the capacity of the PDCCH.

Figure 3C:
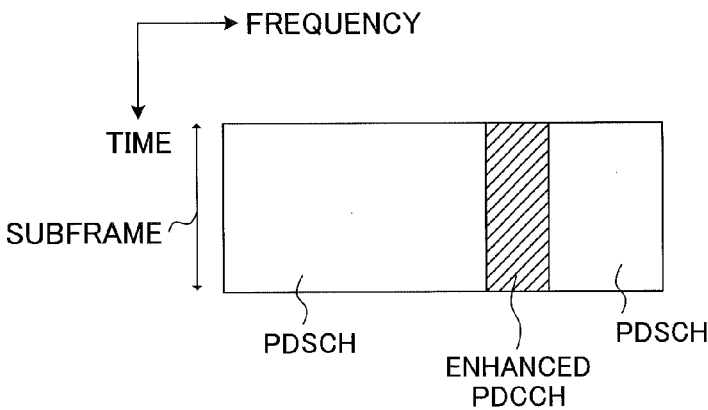

Furthermore, as shown in FIG. 3C, a method of frequency-division-multiplexing the PDSCH and the PDCCH in a new radio resource structure (new carrier), in which no conventional PDCCH region is provided, is also possible. This approach may be effective in, for example, a HetNet (Heterogeneous Network) in which carrier aggregation is employed.

Hereinafter, a PDCCH (FIG. 3B) that is frequency-division-multiplexed with the PDSCH in the FDM approach will be referred to as an "enhanced PDCCH" (enhanced downlink control channel). This enhanced PDCCH may also be referred to as an "enhanced PDCCH," an "ePDCCH," an "EPDCCH," an "FDM-type PDCCH," a "UE-PDCCH," and so on. However, a PDCCH (FIG. 3C) that is frequency-division-multiplexed with the PDSCH in the new radio resource structure and/or the like may also be included as an enhanced PDCCH.

Figure 4:
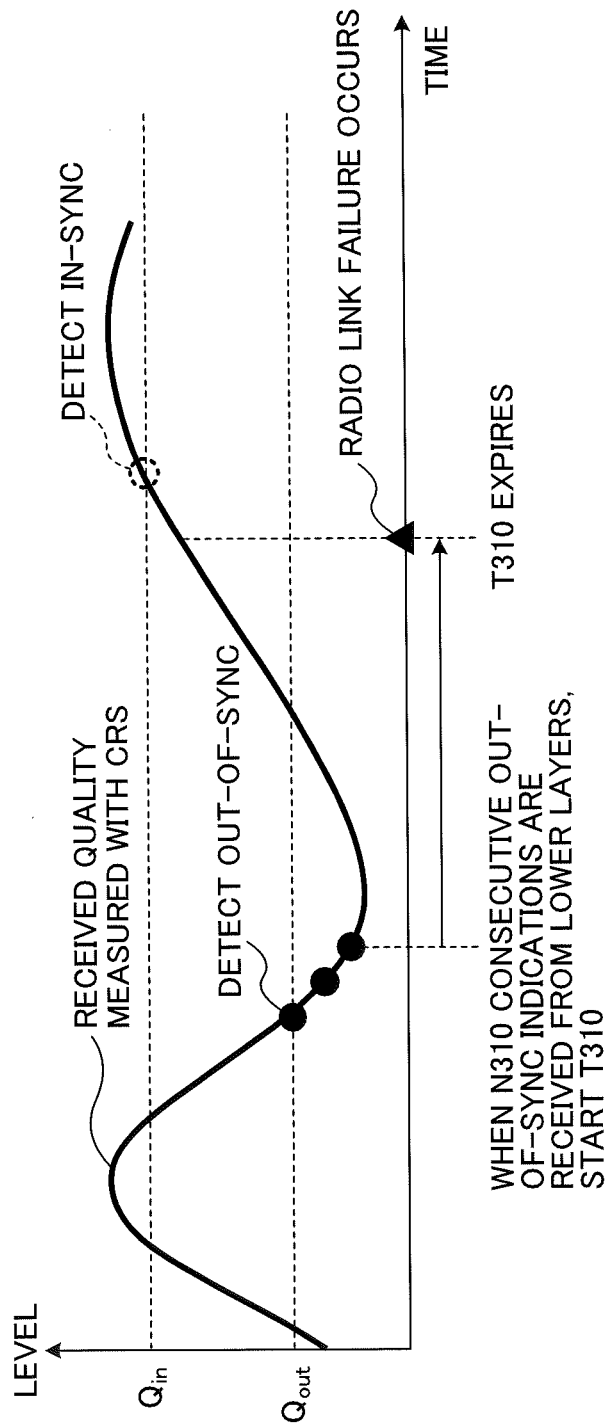
FIG. 4 is a schematic diagram to explain radio link monitoring.

Radio link monitoring (RLM) to monitor downlink quality based on the received quality of downlink reference signals such as CRSs (Cell-specific Reference Signals) is employed in radio communication systems that support LTE or LTE-A. FIG. 4 is a schematic diagram to explain RLM. In RLM, a user terminal UE monitors downlink radio quality based on received quality, which may be the SIR (Signal-to-Interference Ratio) that is measured with downlink reference signals from the radio base station eNB, and/or the like, and thresholds $Q_{out}$ and $Q_{in}$.

The threshold $Q_{out}$ matches the threshold of the lower-level end, and is defined as received quality that is equivalent to a block error rate (BLER) of the PDCCH at which the downlink cannot be reliably received. To be more specific, the threshold $Q_{out}$ is equivalent to an SIR that is required to satisfy a BLER of 10%. The threshold $Q_{in}$ matches the threshold of the higher-level end, and is defined as received quality that is equivalent to a BLER of the PDCCH at which the downlink can be significantly more reliably received. To be more specific, the threshold $Q_{in}$ is equivalent to an SIR that is required to satisfy a BLER of 2%.

For example, as shown in FIG. 4, the received quality measured with downlink reference signals (in FIG. 4, CRSs) falls below the threshold $Q_{out}$, "out-of-sync," which indicates a decrease in the received quality of downlink reference signals, is detected. If this "out-of-sync" is detected a predetermined number of times in a row (three times in FIG. 4), a timer (T310) for judging radio link failures (RLFs) is started. The number of times "out-of-sync" continues (N310) and triggers the timer is reported from the radio base station eNB and/or the like to the user terminal UE through higher layer signaling (for example, RRC signaling).

When the received quality of downlink reference signal exceeds the threshold $Q_{in}$, "in-sync," which indicates the recovery of the received quality of downlink reference signals, is detected. If "in-sync" is detected a predetermined number of times in a row before the timer expires, the timer is canceled (reset, stopped and so on). The number of times "in-sync" continues (N311) is reported from the radio base station eNB and/or the like to the user terminal UE through higher layer signaling (for example, RRC signaling). If, as shown in FIG. 4, the timer expires without "in-sync" being detected a predetermined number of times in a row, the user terminal UE determines an RLF and performs various kinds of processes for recovering communication quality. For example, the user terminal UE stops uplink transmission in order to reduce interference, and starts a reconnection control.

This RLM is optimized for conventional radio resource structures. In a radio communication system in which an enhanced PDCCH is employed, the conditions for monitoring downlink quality may be different from those of conventional radio communication systems. For example, while the received quality of CRSs is measured in conventional radio communication systems, in a radio communication systems in which a new radio resource structure to include an enhanced PDCCH is employed, it may be possible to measure the received quality of other downlink reference signals such as DM-RSs. By using DM-RSs, it is possible to achieve beam forming gain that is in accordance with the user terminal UE even with the enhanced PDCCH, like downlink data that is transmitted in the PDSCH.

In a radio communication system in which a new radio resource structure to include an enhanced PDCCH is employed, improvement of performance by means of inter-ference coordination (eICIC: enhanced Inter-Cell Interference Coordination) is expected. Furthermore, a study is in progress to support a high aggregation level (16 ECCEs) with the enhanced PDCCH.

In this way, in a radio communication system in which a new radio resource structure to include an enhanced PDCCH is employed, the conditions for monitoring downlink quality are different, and therefore there is a threat that downlink quality cannot be monitored adequately. For example, there is a threat that an RLF may be determined even when the state of communication is not so poor. There is a threat that an RLF may not be determined even when the state of communication is severely poor.

In view of this problem, the present inventors have thought that it may be possible to monitor downlink quality adequately even in a radio communication system in which a new radio resource structure is employed, by carrying out RLM by selectively using criteria (thresholds) that are suitable for the new radio resource structure. That is to say, a gist of the present invention is to determine RLFs based on first criteria (which correspond to the thresholds $Q_{out}$ and $Q_{in}$) and/or second criteria, which are different from the first criteria. Now, examples of the present invention will be described below, assuming a radio communication system in which a new radio resource structure to include an enhanced PDCCH is employed. However, the present invention is equally applicable to radio communication systems that employ radio resource structures such as the ones shown in FIG. 3C.

(First Example)

Figure 5:
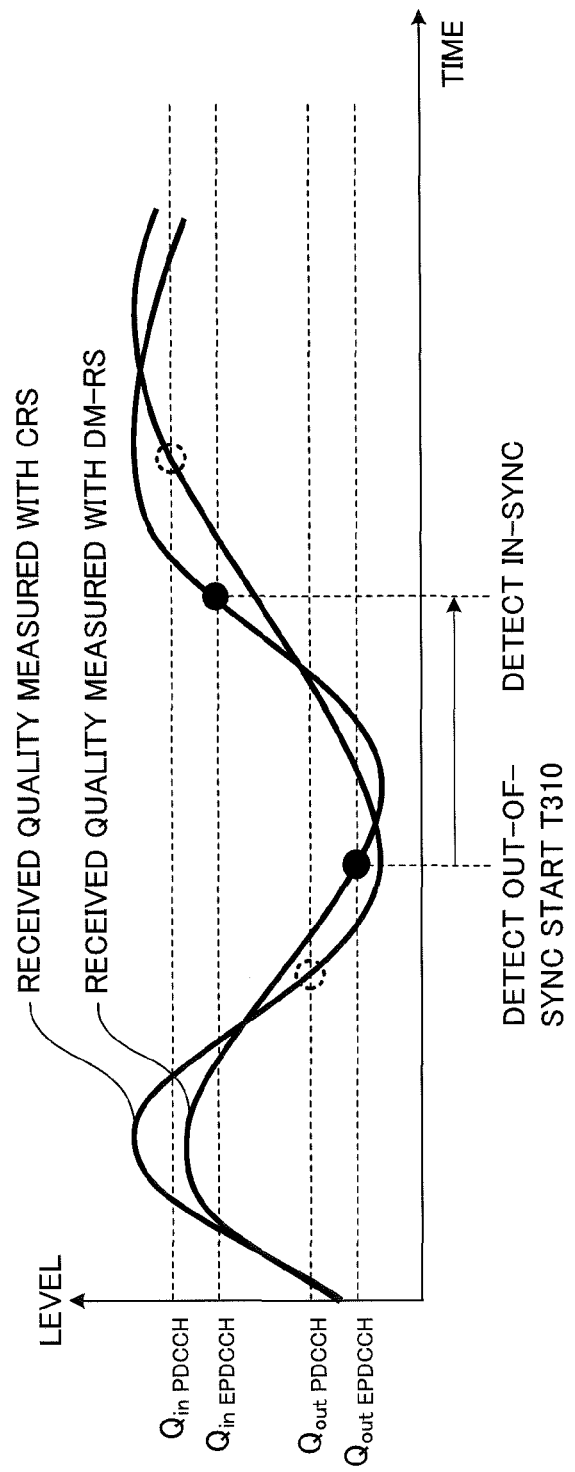
FIG. 5 is a schematic diagram to explain the radio link monitoring according to a first example.

As a first example, an example of carrying out RLM based on thresholds (second criteria) to support a new radio resource structure will be described. FIG. 5 is a schematic diagram to explain the RLM according to the first example. Hereinafter, the thresholds $Q_{out}$ and $Q_{in}$ (see FIG. 4) that are used in RLM optimized for conventional radio resource structures will be described as threshold $Q_{out\_PDCCH}$ and $Q_{PDCCH}$ (first criteria). in FIG. 5, the received quality measured with DM-RSs and the received quality measured with CRSs (see FIG. 4) are shown together.

As shown in FIG. 5, with the present example, when an enhanced PDCCH is configured, RLM is carried out based on thresholds $Q_{out\_EPDCCH}$ and $Q_{in\_EPDCCH}$ (second criteria), which are different from the conventional thresholds $Q_{out\_PDCCH}$ and $Q_{in\_PDCCH}$. The threshold $Q_{out\_EPDCCH}$ corresponds to the threshold of the lower-level end, and is defined as received quality that is equivalent to a block error rate (BLER) of the enhanced PDCCH at which the downlink cannot be reliably received. $Q_{in\_EPDCCH}$ corresponds to the threshold of the higher-level end, and is defined as received quality that is equivalent to a BLER of the enhanced PDCCH at which the downlink can be significantly more reliably received. FIG. 5 shows an example in which the threshold $Q_{out\_EPDCCH}$ is set at a lower level than the threshold $Q_{out\_PDCCH}$ (equivalent to, for example, a PDCCH BLER higher than 10%), and the threshold $Q_{in\_EPDCCH}$ is set at a lower level than the threshold $Q_{in\_PDCCH}$ (equivalent to, for example, a PDCCH BLER higher than 2%).

As noted earlier, the enhanced PDCCH is demodulated using DM-RSs, which are user terminal UE-specific reference signals. Consequently, the correlation between the block error rate of the enhanced PDCCH and the received quality of DM-RSs increases. So, with the present example, when an enhanced PDCCH is configured, RLM is carried out by comparing the received quality of DM-RSs transmitted from the radio base station eNB against the thresholds $Q_{out\_EPDCCH}$ and $Q_{in\_EPDCCH}$, which correspond to BLERs of the enhanced PDCCH.

For example, when, as shown in FIG. 5, the received quality measured with DM-RSs falls below the threshold $Q_{out\_EPDCCH}$, "out-of-sync," which indicates a decrease in the received quality of DM-RSs, is detected. If this "out-of-sync" is detected a predetermined number of times in a row (in FIG. 5, once), a timer (T310) for judging radio link failures (RLFs) is started. The number of times "out-of-sync" continues (N310) and triggers the timer is reported from the radio base station eNB and/or the like to the user terminal UE through higher layer signaling.

When the received quality of DM-RSs exceeds the threshold $Q_{in\_EPDCCH}$, "in-sync," which indicates the recovery of the received quality of DM-RSs is detected. If "in-sync" is detected a predetermined number of times in a row before the timer expires, the timer is cancelled (reset, stopped, and so on). The number of times "in-sync" continues (N311) is reported from the radio base station eNB and/or the like to the user terminal UE through higher layer signaling. If the timer expires without "in-sync" being detected a predetermined number of times in a row, the user terminal UE determines an RLF and performs various kinds of processes for recovering communication quality. That is, the user terminal UE stops uplink transmission in order to reduce interference, and starts a reconnection control.

In this way, with the present example, when an enhanced PDCCH is configured, RLFs are determined based on thresholds $Q_{out\ EPDCCH}$ and $Q_{in\ EPDCCH}$ that are suitable to monitor the quality of the enhanced PDCCH, so that, even in the situation where RLFs may be determined in conventional RLM (see FIGS. 4 and 5), it is possible to evaluate the quality of the enhanced PDCCH adequately, and avoid judging RLFs (see FIG. 5). That is, it is possible to monitor downlink quality adequately even in a radio communication systems where a new radio resource structure is employed. The present example is effective when, for example, the communication performance of the enhanced PDCCH is better than the communication performance of the PDCCH.

FIG. 6 is a diagram to show example enhanced PDCCH information elements (EPDCCH-Config information elements) that can support the RLM of the present embodiment. In FIG. 6, "rlmResource," which reports the monitoring of the enhanced PDCCH, "rlmPeriodCoeff," which indicates the measurement cycle of the monitoring, and so on are defined.

Although an example of comparing the received quality of DM-RSs against thresholds $Q_{out\ EPDCCH}$ and $Q_{in\ EPDCCH}$ is shown with the present example, it is equally possible to compare the received quality of various kinds of downlink reference signals such as CRSs, CSI-RSs (Channel State Information-Reference Signals) against the thresholds $Q_{out\ EPDCCH}$ and $Q_{in\ EPDCCH}$. In that case, it is preferable to change the thresholds $Q_{out\ EPDCCH}$ and $Q_{in\ EPDCCH}$ in accordance with the downlink reference signals used in RLM.

Although an example to set the threshold $Q_{out\ EPDCCH}$ at a lower level than the threshold $Q_{out\ PDCCH}$ and set the threshold $Q_{in\ EPDCCH}$ at a lower level than the threshold $Q_{in\ PDCCH}$ is shown with the present example, the thresholds $Q_{out\ EPDCCH}$ and $Q_{in\ EPDCCH}$ are by no means limited to these. It is equally possible to set the threshold $Q_{out\ EPDCCH}$ at a higher level than the threshold $Q_{out\ PDCCH}$ and set the threshold $Q_{in}$ EPDCCH at a higher level than the threshold $Q_{in\ PDCCH}$.

Whether or not to employ the present example may be determined in advance in the specifications of the radio communication system, or may be reported from the radio base station eNB to the user terminal UE by way of signaling.

(Second Example)

As a second example, an example of carrying out RLM based on conventional thresholds (first criteria) will be described. With the present example, RLM is carried out based on conventional thresholds $Q_{out\ PDCCH}$ and $Q_{in\ PDCCH}$ (first criteria) even when an enhanced PDCCH is configured. That is to say, with the present example, the received quality of CRSs transmitted from the radio base station eNB is compared against the thresholds $Q_{out\ PDCCH}$ and $Q_{in\ PDCCH}$, which correspond to BLERs of the PDCCH.

With the present embodiment, when the received quality measured with CRSs falls below the threshold $Q_{out\ PDCCH}$, "out-of-sync," which indicates a decrease of received quality, is detected. When this "out-of-sync" is detected a predetermined number of times in a row, the timer for judging RLFs is started. The number of times "out-of-sync" continues and triggers the timer is reported from the radio base station eNB to the user terminal UE through higher layer signaling.

When the received quality of CRSs exceeds the threshold $Q_{in\ PDCCH}$, "in-sync," which indicates the recovery of received quality, is detected. If "in-sync" is detected a predetermined number of times in a row before the timer expires, the timer is canceled. The number of times "in-sync" continues is reported from the radio base station eNB and/or the like to the user terminal UE through higher layer signaling. If the timer expires without "in-sync" being detected a predetermined number of times in a row, the user terminal UE determines an RLF and performs various kinds of processes. Although an example of comparing the received quality of CRSs against thresholds $Q_{out\ PDCCH}$ and $Q_{in\ PDCCH}$ the present PDCCH is shown with example, it is equally possible to compare the received quality of various kinds of downlink reference signals such as DM-RSs, CSI-RSs and so on against the thresholds $Q_{out\ PDCCH}$ and $Q_{in\ PDCCH}$.

The present example is effective when, for example, the communication performance of the PDCCH is better than the communication performance of the enhanced PDCCH. Whether or not to employ the present example may be determined in advance in the specifications of the radio communication system, or may be reported from the radio base station eNB to the user terminal UE by way of signaling.

(Third Example)

An example of carrying out RLM by selectively using conventional thresholds (first criteria) and thresholds that support a new radio resource structure (second criteria) will be described with the present example. With the present example, one of the first example and the second example is used, selectively, depending on the states of the radio communication system.

For example, in the situation in which the communication performance of the enhanced PDCCH is better than the communication performance of the PDCCH, the first example is selected. In this case, the radio base station eNB reports to the user terminal UE that RLM is going to be carried out using the first criteria. The reporting may be sent using, for example, higher layer signaling. The user terminal UE carries out RLM by comparing the received quality of downlink reference signals from the radio base station eNB against thresholds $Q_{out\ EPDCCH}$ and $Q_{in\ EPDCCH}$. The details are the same as in the first example.

For example, in the situation in which the communication performance of the PDCCH is better than the communication performance of the enhanced PDCCH, the second example is selected. In this case, the radio base station eNB reports to the user terminal UE that RLM is going to be carried out using the second criteria. The user terminal UE carries out RLM by comparing the received quality of downlink reference signals from the radio base station eNB against the conventional thresholds $Q_{out\ PDCCH}$ and $Q_{in\ PDCCH}$. The details are the same as in the second example.

With the present example, RLM can be carried out by selecting between the first example and the second example based on the communication performance of the PDCCH and the communication performance of the enhanced PDCCH, so that RLM of high accuracy, which matches the states of the radio communication system, is made possible. That is, it is possible to monitor downlink quality more adequately. Although an example to report the criteria to be used in RLM from the radio base station eNB to the user terminal UE is shown with the present example, it is equally possible to report only changes of the criteria from the radio base station eNB to the user terminal UE.

(Fourth Example)

With the present example, an example of carrying out RLM by using conventional thresholds (first criteria) and thresholds that support a new radio resource structure (second criteria) together will be described. FIG. 7 provides schematic diagrams to explain the RLM according to the fourth example.

With the present embodiment, a conventional threshold (first criterion) and a threshold that supports the new radio resource structure (second criteria) are used together in sequences to start the timer. To be more specific, for example, when "out-of-sync" is detected based on the first criterion (threshold $Q_{out\_PDCCH}$) and "out-of-sync" is detected based on the second criterion (threshold $Q_{out\_EPDCCH}$), the timer is started (sequence 4A). For example, when "out-of-sync" is detected based on the first criterion (threshold $Q_{out\_PDCCH}$) or "out-of-sync" is detected based on the second criterion (threshold $Q_{out\_EPDCCH}$), the timer is started (sequence 4B).

Furthermore, with the present embodiment, a conventional threshold (first criterion) and a threshold that supports the new radio resource structure (second criterion) are used together in sequences to cancel the timer. To be more specific, for example, the timer is canceled when "in-sync" is detected based on the first criterion (threshold $Q_{in\_PDCCH}$) and "in-sync" is detected based on the second criterion (threshold $Q_{in\_EPDCCH}$) (sequence 4C). For example, when "in-sync" is detected based on the first criterion (threshold $Q_{in\_PDCCH}$) or "in-sync" is detected based on the second criterion (threshold $Q_{in\_EPDCCH}$), the timer is canceled (sequence 4D).

That is to say, with the present example, RLM is carried out by combining the above sequence 4A or sequence 4B, with the sequence 4C or sequence 4D. FIG. 7A shows RLM that is carried out by combining the sequence 4A and the sequence 4D, and FIG. 7B shows RLM that is carried out by combining the sequence 4B and the sequence 4C.

In FIG. 7A, at time TA1, the received quality measured with CRSs falls below the threshold $Q_{out\_PDCCH}$, and "out-of-sync" to indicate a decrease of the received quality of CRSs is detected. At time TA2, the received quality measured with DM-RSs falls below the threshold $Q_{out\_EPDCCH}$, and "out-of-sync" to indicate a decrease of the received quality of DM-RSs is detected. As a result of this, the timer for judging RLFs is started (sequence 4A). The timer may be started on condition that "out-of-sync" is detected a predetermined number of times in a row.

In FIG. 7A, at time TA3, the received quality measured with CRSs exceeds the threshold $Q_{in\_PDCCH}$, and "in-sync" to indicate the recovery of received quality is detected. As a result of this, the timer is cancelled (sequence 4D). If the timer expires without detecting "in-sync," the user terminal UE determines an RLF and performs various kinds of processes for recovering communication quality. That is to say, the user terminal UE stops uplink transmission in order to reduce interference, and starts a re-connection control. The timer may be cancelled on condition that "in-sync" is detected a predetermined number of times in a row.

In this way, in the example to use the sequence 4A and the sequence 4D, the timer is not started even when one of the received quality of CRSs and the received quality of DM-RSs falls below the criterion (threshold). If one of the received quality of CRSs and the received quality of DM-RSs exceeds the criterion (threshold), the timer is canceled. Consequently, it is possible to keep judging errors to a minimum.

In FIG. 7B, at time TB1, the received quality measured with CRSs falls below the threshold $Q_{out\_PDCCH}$, and "out-of-sync" to indicate a decrease of the received quality of CRSs is detected. As a result of this, the timer is started (sequence 4B). The timer may be started on condition that "out-of-sync" is detected a predetermined number of times in a row.

Furthermore, in FIG. 7B, at time TB2, the received quality measured with CRSs exceeds the threshold $Q_{in\_PDCCH}$, and "in-sync" to indicate the recovery of received quality is detected. At time TB3, the received quality measured with DM-RSs exceeds the threshold $Q_{in\_EPDCCH}$, and "in-sync" to indicate the recovery of received quality is detected. As a result of this, the timer is cancelled (sequence 4C). If the timer expires without "in-sync" being detected based on the threshold $Q_{in\_PDCCH}$ (first criterion) or "in-sync" being detected based on the threshold $Q_{in\_EPDCCH}$ (second criterion), the user terminal UE determines an RLF and performs various kinds of processes. The timer may be canceled on condition that "in-sync" is detected a predetermined number of times in a row.

In this way, in the example to use the sequence 4B and the sequence 4D, the timer is started when one of the received quality of CRSs and the received quality of DM-RSs falls below the criterion (threshold). Even if one of the received quality of CRSs and the received quality of DM-RSs exceeds the criterion (threshold), the timer is not cancelled. Consequently, it is possible to detect a slight decrease of quality on the downlink and determine an RLF.

Although FIG. 7 shows the combination of the sequence 4A and the sequence 4D and the combination of the sequence 4B and the sequence 4C, other combinations may be applicable as well. For example, it is possible to combine the sequence 4A with the sequence 4C, or combine the sequence 4B with the sequence 4D. In this way, it is possible to further improve the accuracy of RLM by using the first criteria and the second criteria together. That is, it is possible to monitor downlink quality more adequately.

FIG. 8 provides schematic diagrams to explain example variations of the RLM according to the fourth example, and show examples where the timer is started on condition that "out-of-sync" is detected a predetermined number of times in a row (three times in FIG. 8) in the sequence 4A. FIG. 8A shows a case where the number of times "out-of-sync" is detected based on the threshold $Q_{out\_PDCCH}$ and the number of times "out-of-sync" is detected based on the threshold $Q_{out\_EPDCCH}$ are counted separately, and FIG. 8B shows a case where the number of times "out-of-sync" is detected based on the threshold $Q_{out\_PDCCH}$ and the number of times "out-of-sync" is detected based on the threshold $Q_{out\_EPDCCH}$ are counted as a sum.

In FIG. 8A, at times TC1, TC2 and TC3, the received quality measured with CRSs falls below the threshold $Q_{out\_PDCCH}$, and "out-of-sync" to indicate a decrease in the received quality of CRSs is detected three times in a row. At times TC3, TC4 and TC5, the received quality measured with DM-RSs falls below the threshold $Q_{out\_EPDCCH}$, and "out-of-sync" to indicate a decrease in the received quality of DM-RSs is detected three times in a row. By this means, "out-of-sync" is detected three times in a row in each event, and the timer is started.

This example can be applied to the sequence 4B as well. In the sequence 4B, the number of times "out-of-sync" is detected based on the threshold $Q_{out\_PDCC}$ and the number of times "out-of-sync" is detected based on the threshold $Q_{out\_EPDCCH}$ may be counted separately, and the timer may be started on condition that one of the numbers of times "out-of-sync" is detected in a row reaches a predetermined number of times.

In FIG. 8B, at times TD1 and TD2, the received quality measured with CRSs falls below the threshold $Q_{out\_PDCCH}$, and "out-of-sync" to indicate a decrease in the received quality of CRSs is detected twice in a row. At times TD2 and TD3, the received quality measured with DM-RSs falls below the threshold $Q_{out\_EPDCCH}$, and "out-of-sync" to indicate a decrease in the received quality of DM-RSs is detected twice in a row. By this means, "out-of-sync" is detected three times in a row in each event, and the timer is started.

Although FIG. 8 shows the detection of "out-of-sync," the same holds with the detection of "in-sync" as well. For example, in the sequence 4C, it is possible to count the number of times "in-sync" is detected based on the threshold $Q_{in\_PDCCH}$ and the number of times "in-sync" is detected based on the threshold $Q_{in\_EPDCCH}$, separately, and cancel the timer. It is equally possible to count a sum of the number of times "in-sync" is detected based on the threshold $Q_{in\_PDCCH}$ and the number of times "in-sync" is detected based on the threshold $Q_{in\_EPDCCH}$ and cancel the timer. In the sequence 4D, the number of times "in-sync" is detected based on the threshold $Q_{in\_PDCCH}$ and the number of times "in-sync" is detected based on threshold $Q_{in\_EPDCCH}$ may be counted separately, and the timer may be canceled on condition that one of the numbers of times "in-sync" is detected in a row reaches a predetermined number of times.

Although examples of comparing the received quality of CRSs against thresholds $Q_{out\_PDCCH}$ and $Q_{in\_PDCCH}$ are shown with the present example, it is equally possible to compare the received quality of various kinds of downlink reference signals such as DM-RSs and CSI-RSs against the thresholds $Q_{out\_PDCCH}$ and $Q_{in\_PDCCH}$. Although examples of comparing the received quality of DM-RSs against thresholds $Q_{out\_EPDCCH}$ and $Q_{in\_EPDCCH}$ are shown with the present example, it is equally possible to compare the received quality of various kinds of downlink reference signals such as CRSs and CSI-RSs against thresholds $Q_{out\_EPDCCH}$ and $Q_{in\_EPDCCH}$.

Although examples to set the threshold $Q_{out\_EPDCCH}$ at a lower level than the threshold $Q_{out\_PDCCH}$ and set the threshold $Q_{in\_EPDCCH}$ at a lower level than the threshold $Q_{in\_PDCCH}$ are shown with the present example, the thresholds $Q_{out\_EPDCCH}$ and $Q_{in\_EPDCCH}$ are by no means limited to these. It is equally possible to set the threshold $Q_{out\_EPDCCH}$ at a higher level than the threshold $Q_{out\_PDCCH}$ and set the threshold $Q_{in\_EPDCCH}$ at a higher level than the threshold $Q_{in\_PDCCH}$.

(Fifth Example)

Figure 9:
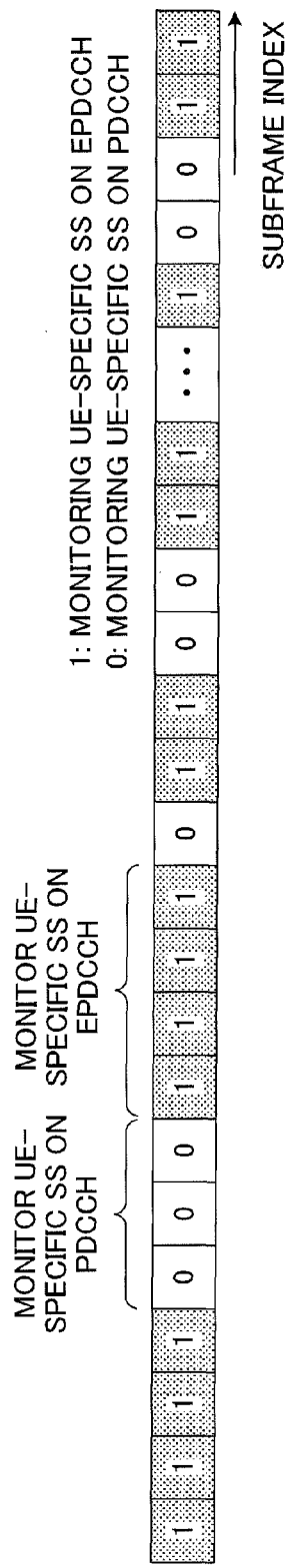
FIG. 9 is a schematic diagram to explain the radio link monitoring according to a fifth example.

A case of switching between conventional RLM and the RLMs of the first to fourth examples will be described with the present example. FIG. 9 is a schematic diagram to explain the RLM according to the fifth example. In the enhanced PDCCH (release 11), user terminal UE-specific search spaces (UE-specific SSs) are supported in order to transmit DL assignments, UL grants and so on. In the enhanced PDCCH (release 11), common search spaces (common SSs) for transmitting cell-specific control information are not supported. However, in the future, common SSs may be supported in the enhanced PDCCH.

Signaling for reporting the monitoring of the UE-specific SSs of the enhanced PDCCH or the UE-specific SSs of the PDCCH to the user terminal UE is supported. For example, the user terminal UE monitors the UE-specific SSs of the PDCCH only in subframes that are reported by way of signaling, and monitors the UE-specific SSs of the enhanced PDCCH in the other subframes. However, the manner of reporting is by no means limited to this. It is equally possible to report the subframes to monitor the UE-specific SSs of the PDCCH and the subframes to monitor the UE-specific SSs of the enhanced PDCCH together to the user terminal UE.

In the subframes to monitor the UE-specific SSs of the enhanced PDCCH, the user terminal UE monitors the common SSs of the PDCCH.

So, with the present example, RLM is switched between the subframes to monitor the UE-specific SSs of the PDCCH and the subframes to monitor the UE-specific SSs of the enhanced PDCCH. To be more specific, as shown in FIG. 9, in the subframes (0) to monitor the UE-specific SSs of the PDCCH, conventional RLM is carried out (see FIG. 4). In the subframes (1) to monitor the UE-specific SSs of the enhanced PDCCH, the RLM according to the first to fourth examples is carried out. That is to say, the received quality of downlink reference signals is compared against conventional thresholds (first criteria) in the subframes (0) for monitoring the UE-specific SSs of the PDCCH, and the received quality of downlink reference signals is compared against one or both of conventional thresholds (first criteria) and thresholds that support the new radio resource structure (second criteria) in the subframes (1) for monitor the UE-specific SSs of the enhanced PDCCH.

In this way, with the present example, RLM is switched between the subframes to monitor the UE-specific SSs of the PDCCH and the subframes to monitor the UE-specific SSs of the enhanced PDCCH, so that RLM of high accuracy is made possible depending on the radio sources to monitor. That is, it is possible to monitor downlink quality more adequately.

(Example Structure of Radio Communication System)

Figure 10:
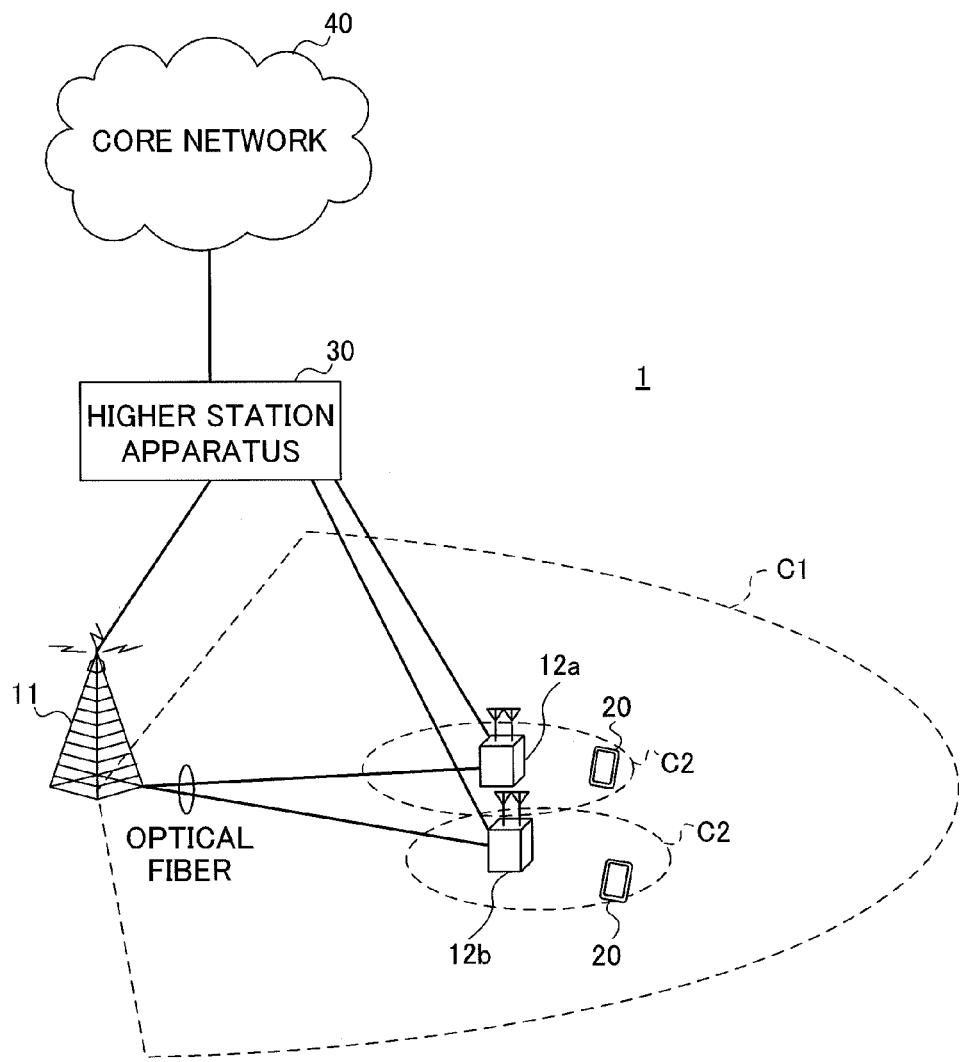
FIG. 10 is a schematic diagram to show an example structure of a radio communication system according to the present embodiment.

Now, the radio communication system according to the present embodiment will be described below in detail. FIG. 10 is a schematic diagram to show an example structure of a radio communication system according to the present embodiment. The radio communication system shown in FIG. 10 is a system to accommodate, for example, the LTE system or SUPER 3G, and employs the RLM according to the first to fifth examples. This radio communication system employs carrier aggregation to group a plurality of fundamental frequency blocks (component carriers) into one, where the system band of the LTE system constitutes one unit. This radio communication system may be referred to as "IMT-Advanced," or may be referred to as "4G" or "FRA (Future Radio Access)."

As shown in FIG. 10, the radio communication system 1 has a radio base station 11 that forms a macro cell C1, and radio base stations 12a and 12b that are placed in the macro cell C1 and that form small cells C2, which are narrower than the macro cell C1. User terminals 20 are placed in the macro cell C1 and in each small cell C2. The user terminals 20 are configured to be able to perform radio communication with both of the radio base stations 11 and 12.

Communication between the user terminals 20 and the radio base station 11 is carried out using a carrier of a relatively low frequency band (for example, the 2 GHz band) and a wide bandwidth (referred to as, for example, a "conventional carrier," a "legacy carrier" and so on). Communication between the user terminals 20 and the radio base stations 12 may be carried out using a carrier of a relatively high frequency band (for example, the 3.5 GHz band) and a narrow bandwidth, or may be carried out using the carrier of a wide bandwidth that is used in communication between the user terminals 20 and the radio base station 11. The radio base station 11 and each radio base station 12 are connected by wire connection or by wireless connection.

The radio base station 11 and the radio base stations 12 are each connected with a core network 40 via a higher station apparatus 30. The higher station apparatus 30 may be, for example, an access gateway apparatus, a radio network controller (RNC), a mobility management entity (MME) and so on. However, the higher station apparatus 30 is by no means limited to these. Each radio base station 12 may be connected with the higher station apparatus 30 via the radio base station 11.

The radio base station 11 is a radio base station having a relatively wide coverage, and may be referred to as an "eNB (eNodeB)," a "radio base station apparatus," a "transmission point" and so on. The radio base stations 12 are radio base stations having local coverages, and may be referred to as "pico base stations," "femto base stations," "Home eNodeBs," "RRHs (Remote Radio Heads)," "micro base stations," "transmission points" and so on. Now, a radio base station 10, which covers both of the radio base stations 11 and 12, will be described below. Each user terminal 20 is a terminal that supports various communication schemes such as LTE, LTE-A and so on, and is by no means limited to a mobile communication terminal and can be a fixed communication terminal as well.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Here, communication channels to be used in the radio communication system 1 shown in FIG. 10 will be described. Downlink communication channels include a PDSCH (Physical Downlink Shared Channel), which is used by each user terminal 20 on a shared basis, and downlink L1/L2 control channels (PDCCH, PCFICH, PHICH and enhanced PDCCH). User data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel). Scheduling information for the PDSCH and the PUSCH and so on may be transmitted by the enhanced PDCCH (referred to as, for example, an "enhanced physical downlink control channel," an "ePDCCH," an "E-PDCCH," an "FDM-type PDCCH," a "UE-PDCCH" and so on). This enhanced PDCCH (enhanced downlink control channel) is frequency-division-multiplexed with the PDSCH (downlink shared data channel), and used to cover the shortage of the capacity of the PDCCH.

Uplink control channels include a PUSCH (Physical Uplink Shared CHannel), which is used by each user terminal 20 on a shared basis as an uplink data channel, and a PUCCH (Physical Uplink Control CHannel), which is an uplink control channel. User data and higher control information are transmitted by this PUSCH. By means of the PUCCH, downlink radio quality information (CQI: Channel Quality Indicator), ACK/NACK and so on are transmitted.

Figure 11:
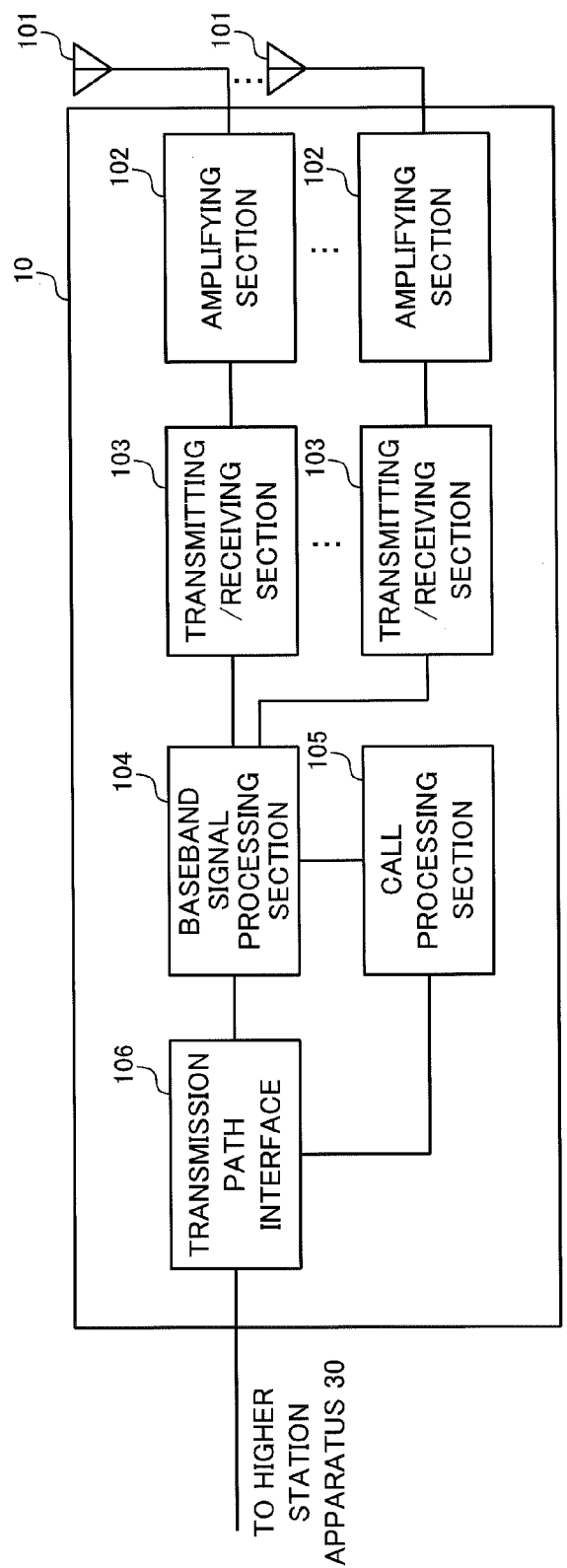
FIG. 11 is a block diagram to show an example structure of a radio base station according to the present embodiment.

FIG. 11 is a block diagram to show an example structure of a radio base station 10 (which covers both the radio base stations 11 and 12) according to the present embodiment. The radio base stations 10 have a plurality of transmitting/receiving antennas 101 for MIMO transmission, amplifying sections 102, transmitting/receiving sections (transmitting sections) 103, a baseband signal processing section 104, a call processing section 105 and a transmission path interface 106.

User data to be transmitted from the radio base station 10 to a user terminal 20 on the downlink is input from the higher station apparatus 30, into the baseband signal processing section 104, via the transmission path interface 106.

In the baseband signal processing section 104, the user data that is input is subjected to a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process, and then transferred to each transmitting/receiving section 103. Furthermore, downlink control information is also subjected to transmission processes such as channel coding and an IFFT process, and transferred to each transmitting/receiving section 103.

The baseband signal processing section 104 reports, to the user terminal 20, control information for allowing communication in the cell, through a broadcast channel. The information for allowing communication in the cell includes, for example, the uplink or downlink system bandwidth and so on.

Each transmitting/receiving section 103 converts the baseband signals that are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

Data to be transmitted from the user terminal 20 to the radio base station 10 on the uplink is received in each transmitting/receiving antenna 101 and input in the amplifying sections 102. Radio frequency signals that are received as input from the transmitting/receiving antennas 101 are amplified in the amplifying sections 102 and sent to each transmitting/receiving section 103. The amplified radio frequency signals are converted into baseband signals in the transmitting/receiving sections 103, and input in the baseband signals processing section 104.

In the baseband signal processing section 104, the user data that is included in the input baseband signals is subjected to a fast Fourier transform (FFT) process, an inverse discrete Fourier transform (IDFT) process, error correction decoding, a MAC retransmission control receiving process, and RLC layer and PDCP layer receiving processes, and the result is transferred to the higher station apparatus 30 via the transmission path interface 106. The call processing section 105 performs call processing such as setting up and releasing communication channels, manages the state of the radio base station 10 and manages the radio resources.

Figure 12:
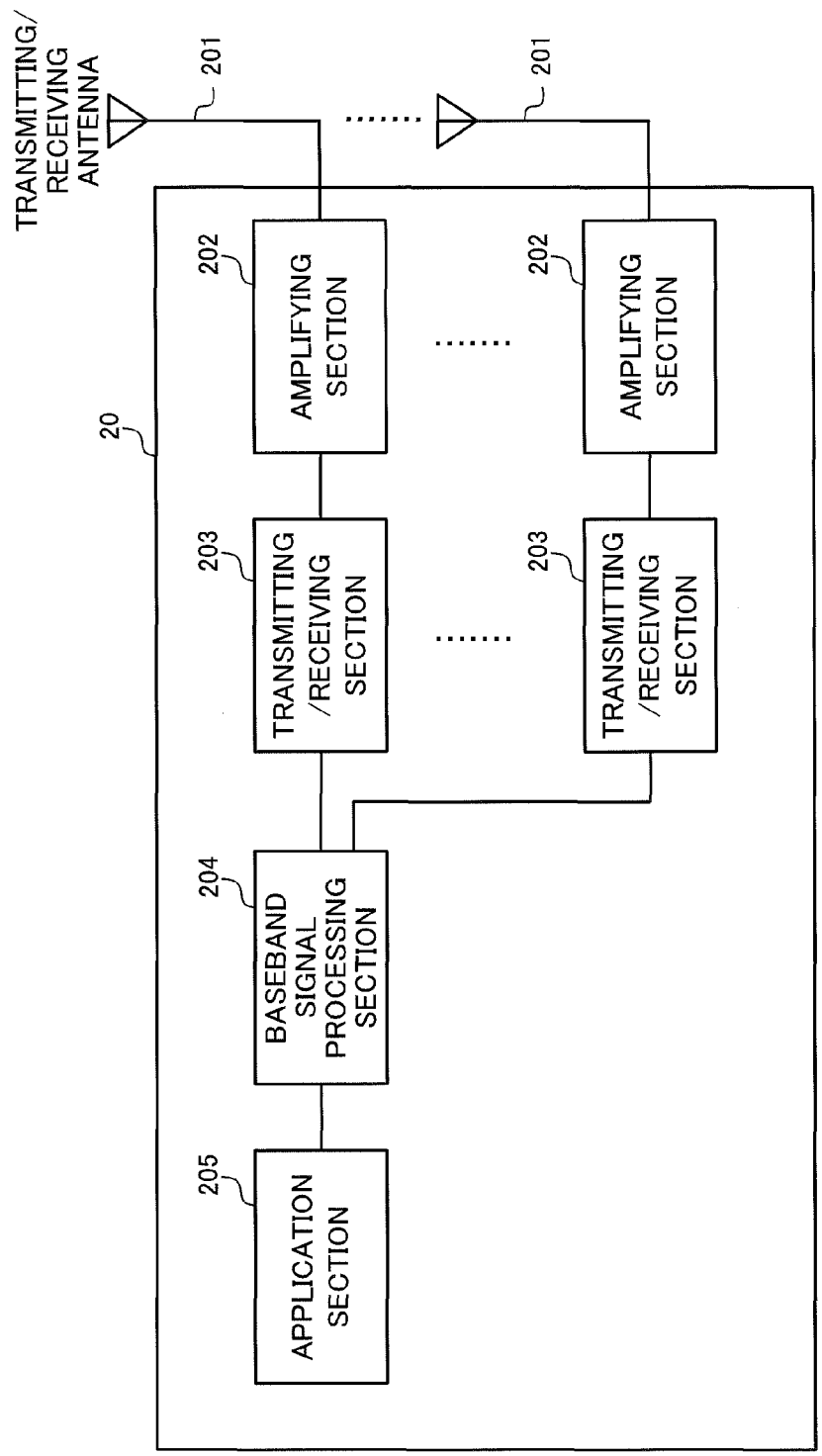
FIG. 12 is a block diagram to show an example structure of a user terminal according to the present embodiment.

FIG. 12 is a block diagram to show an example structure of the user terminal 20 according to the present embodiment. The user terminal 20 has a plurality of transmitting/receiving antennas 201 for MIMO transmission, amplifying sections 202, transmitting/receiving sections 203, a baseband signal processing section 204, and an application section 205.

Downlink data is received in the plurality of transmitting/receiving antennas 201 and input in the amplifying sections 202. Radio frequency signals input from the transmitting/ receiving antennas 201 are amplified in the amplifying sections 202 and sent to the transmitting/receiving sections 203. The amplified radio frequency signals are converted into baseband signals in the transmitting/receiving sections 203, and input in the baseband signal processing section 204. The baseband signals that are input are subjected to receiving processes such as an FFT process, error correction decoding and retransmission control, in the baseband signal processing section 204. The user data that is included in the downlink data is transferred to the application section 205. The application section 205 performs processes related to higher layers above the physical layer and the MAC layer. The broadcast information that is included in the downlink data is also transferred to the application section 205.

Uplink user data is input from the application section 205 to the baseband signal processing section 204. In the baseband signal processing section 204, the user data that is input is subjected to a retransmission control (H-ARQ (Hybrid ARQ)) transmission process, channel coding, precoding, a DFT process, an IFFT process and so on, and then transferred to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Figure 13:
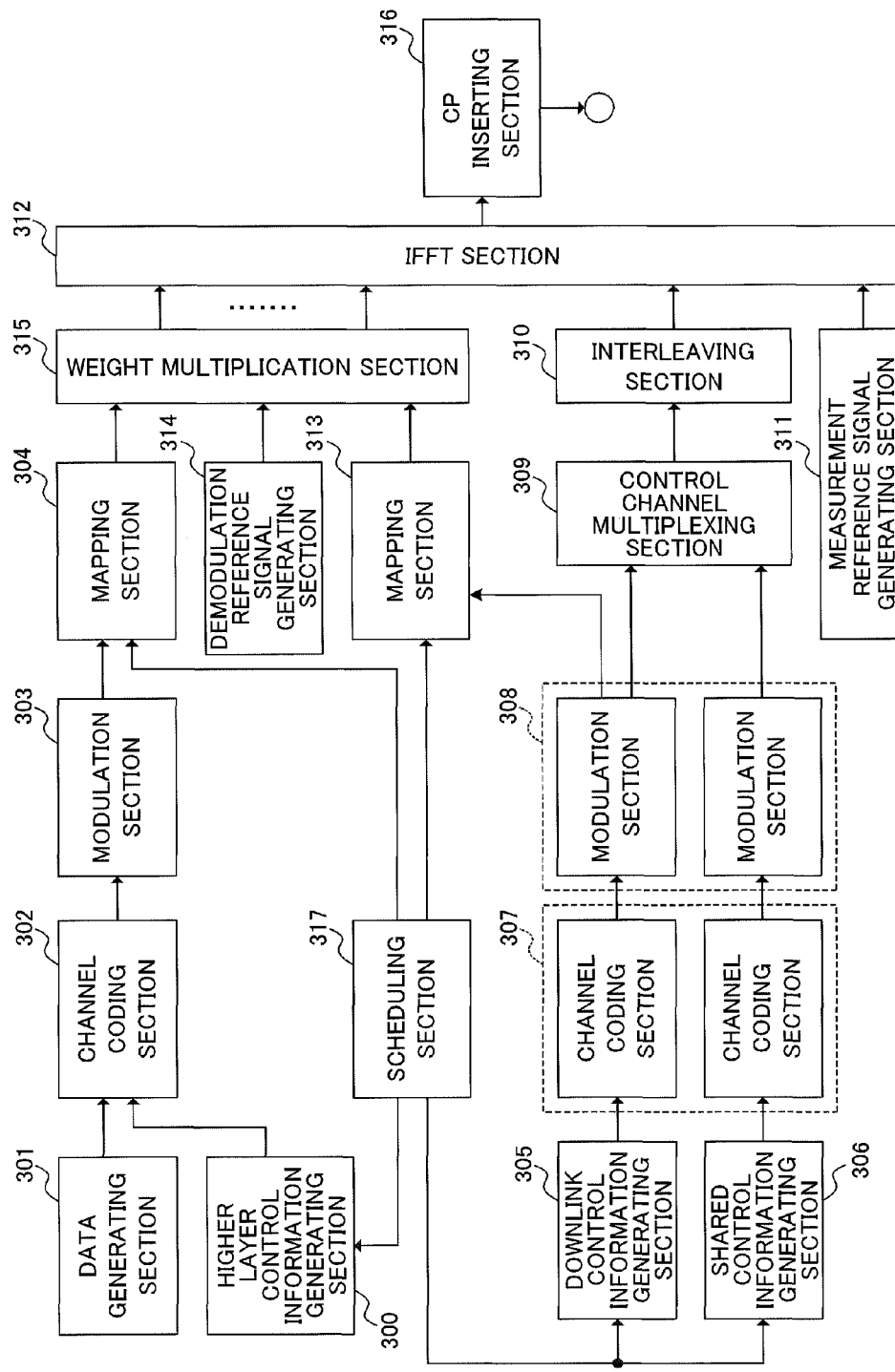
FIG. 13 is a block diagram to show an example structure of a baseband processing section of a radio base station according to the present embodiment.

FIG. 13 is a block diagram to show an example structure of the baseband signal processing section 104 provided in the radio base station 10 according to the present embodiment (including part of the higher layers). Although FIG. 13 primarily shows downlink (transmitting) configurations, the radio base station 10 has, without shortage, uplink (receiving) configurations as well.

As shown in FIG. 13, the radio base station 10 has a higher layer control information generating section 300, a data generating section 301, a channel coding section 302, a modulation section 303, a mapping section 304, a downlink control information generating section 305, a shared control information generating section 306, a channel coding section 307, a modulation section 308, a control channel multiplexing section 309, an interleaving section 310, a measurement reference signal generating section 311, an IFFT section 312, a mapping section 313, a demodulation reference signal generating section 314, a weight multiplication section 315, a CP inserting section 316 and a scheduling section 317. When the radio base station 10 is a radio base station 12 to form a small cell C2, the control channel multiplexing section 309 and the interleaving section 310 may be omitted.

The higher layer control information generating section 300 generates higher layer control information per user terminal 20. The higher layer control information is control information to be signaled through higher layer signaling (for example, RRC signaling), and includes, for example, information related to the number of times "out-of-sync" continues (N310), information related to the number of times "in-sync" continues (N311) and so on, which are used to determine radio link failures (RLFs). When the third example is employed, the higher layer control information generating section 300 generates information for reporting the criteria (first criteria or second criteria) that are used in RLM.

The data generating section 301 generates downlink user data per user terminal 20. The downlink user data that is generated in the data generating section 301 and the higher layer control information that is generated in the higher layer control information generating section 300 are input in the channel coding section 302 as downlink data to be transmitted in the PDSCH. The channel coding section 302 performs channel coding of the downlink data for each user terminal 20 in accordance with coding rates that are determined based on feedback information from each user terminal 20. The modulation section 303 modulates the downlink data having been subjected to channel coding in accordance with modulation schemes that are determined based on feedback information from each user terminal 20. The mapping section 304 maps the modulated downlink data in accordance with commands from the scheduling section 317.

The downlink control information generating section 305 generates user terminal-specific (UE-specific) downlink control information (DCI) on a per user terminal 20 basis. The user terminal-specific downlink control information includes DL assignments, which are PDSCH allocation information, UL grants, which are PUSCH allocation information, and so on. The shared control information generating section 306 generates cell-specific shared control information.

The downlink control information that is generated in the downlink control information generating section 305 and the shared control information that is generated in the shared control information generating section 306 are input in the channel coding sections 307 as downlink control information to be transmitted in the PDCCH or the enhanced PDCCH. The channel coding sections 307 performs channel coding of the downlink control information received as input, in accordance with coding rates designated by the scheduling section 317. The modulation sections 308 modulate the downlink control information after channel coding.

Here, the downlink control information to be transmitted in the PDCCH is input from the modulation sections 308 into the control channel multiplexing section 309 and multiplexed. The downlink control information that is multiplexed in the control channel multiplexing section 309 is interleaved in the interleaving section 310. The interleaved downlink control information is input in the IFFT section 312, with measurement downlink reference signals (CSI-RSs: Channel State Information-Reference Signals, CRSs: Cell-specific Reference Signals, and so on) generated in the measurement reference signal generating section 311.

The downlink control information that is transmitted in the enhanced PDCCH is input from the modulation sections 308 into the mapping section 313. The mapping section 313 maps the downlink control information in predetermined allocation units (for example, in eCCEs or in eREGs) in accordance with commands from the scheduling section 317. The mapping section 313 may map the downlink control information using distributed mapping or map the downlink control information using localized mapping, in accordance with commands from the scheduling section 317.

The mapped downlink control information is input in the weight multiplication section 315, with the downlink data to be transmitted in the PDSCH (that is, the downlink data mapped in the mapping section 304) and the demodulation downlink reference signals (DM-RSs) generated in the demodulation reference signal generating section 314. The weight multiplication section 315 multiplies the downlink data to be transmitted by the PDCSH, the downlink control information to be transmitted by the enhanced PDCCH, and the demodulation downlink reference signals, by user terminal 20-specific precoding weights, and pre-codes them.

The pre-coded transmission data is input in the IFFT section 312, and converted from frequency domain signals into time sequence signals through an inverse fast Fourier transform. Cyclic prefixes (CPs) to function as guard intervals are inserted in the output signals from the IFFT section 312 by the CP inserting section 316, and the signals are output to the transmitting/receiving sections 103.

The scheduling section 317 allocates radio resources to the downlink user data, the downlink control information and so on, based on command information from the higher station apparatus 30 and feedback information from each user terminal 20 (for example, CSI (channel state information), which includes CQIs (Channel Quality Indicators, RIs (Rank Indicators) and so on).

In this radio base station 10, the downlink reference signals (CRSs, CSI-RSs, DM-RSs and so on) to be used in RLM are generated in the measurement reference signal generating section 311 and the demodulation reference signal generating section 314, and transmitted to the user terminal 20 through the transmitting/receiving section 103. When the third example is employed, higher layer control information to include information for reporting the criteria (first criteria or second criteria) to use in RLM is generated in the higher layer control information generating section 300, and transmitted to the user terminal 20 via the transmitting/receiving section 103. When the fifth example is employed, information to report the monitoring of the UE-specific SSs of the enhanced PDCCH or the UE-specific SSs of the PDCCH is transmitted from the radio base station 10 to the user terminal 20.

Figure 14:
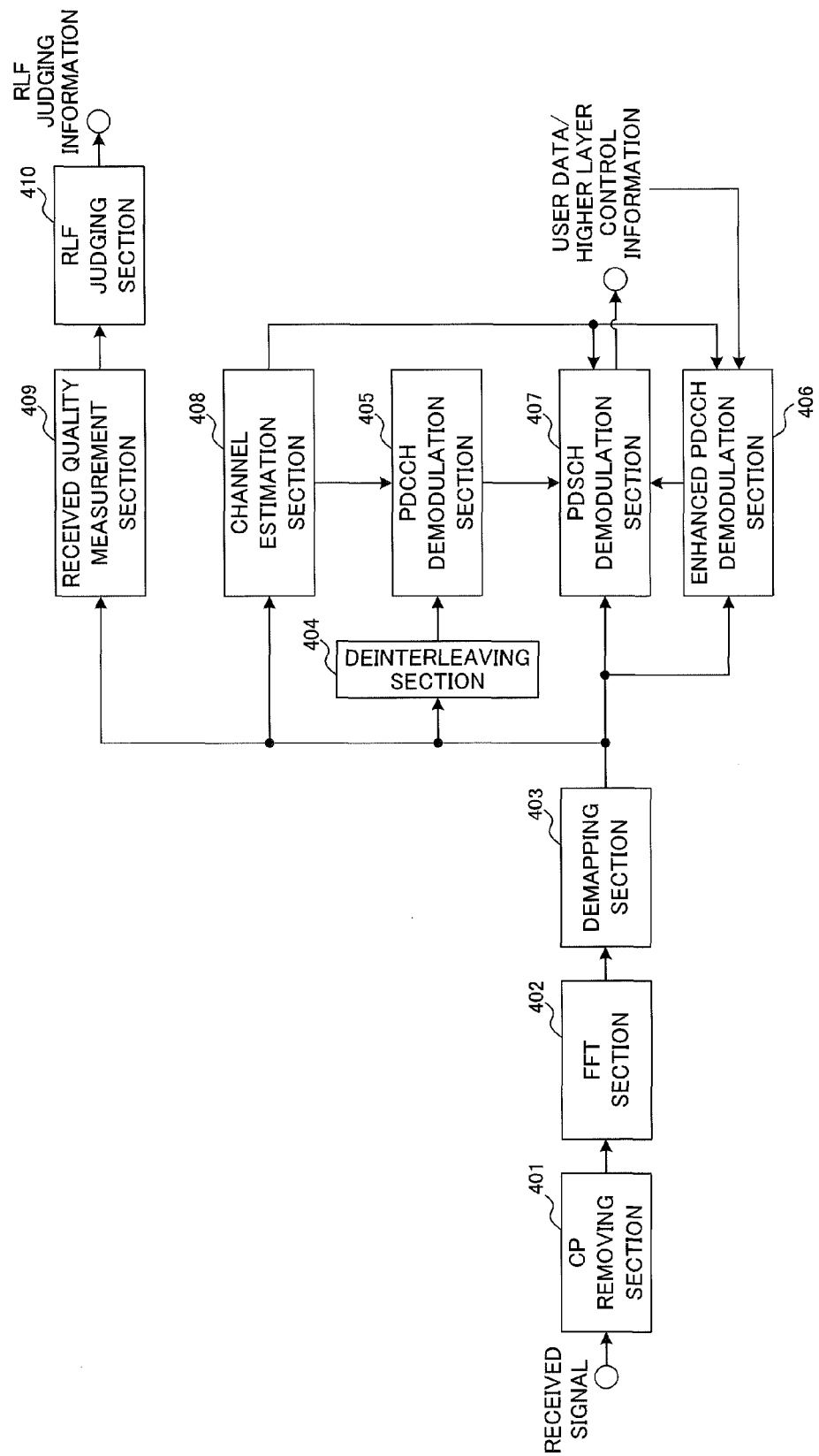
FIG. 14 is a block diagram to show an example structure of a baseband processing section of a user terminal according to the present embodiment.

FIG. 14 is a block diagram to show an example structure of the baseband signal processing section 204 provided in the user terminal 20. The user terminal 20 has, as downlink (receiving) configurations, a CP removing section 401, an FFT section 402, a demapping section 403, a deinterleaving section 404, a PDCCH demodulation section 405, an enhanced PDCCH demodulation section 406, a PDSCH demodulation section 407, a channel estimation section 408, a received quality measurement section (measurement section) 409, and an RLF determining section (determining section) 410.

Downlink signals received from the radio base station 10 as received data have the cyclic prefixes (CPs) removed in the CP removing section 401. The downlink signals, from which the CPs have been removed, are input in the FFT section 402. The FFT section 402 performs a fast Fourier transform (FFT) of the downlink signals, converts the time domain signals into frequency domain signals, and inputs these signals in the demapping section 403. The demapping section 403 demaps the downlink signals. Downlink control information that is output from the demapping section 403 is deinterleaved in the deinterleaving section 404.

The PDCCH demodulation section 405 performs blind decoding, demodulation, channel decoding and so on of the downlink control information (DCI) output from the deinterleaving section 404, based on the result of channel estimation in the channel estimation section 408, which will be described later. To be more specific, the PDCCH demodulation section 405 blind-decodes the candidate search spaces reported from the radio base station 10 in advance or candidate search spaces that are determined in advance, and acquires the downlink control information. The PDCCH demodulation section 405 outputs the DL assignments (PDSCH allocation information) included in the DCI to the PDSCH demodulation section 407.

The enhanced PDCCH demodulation section 406 performs blind decoding, demodulation, channel decoding and so on of the downlink control information (DCI) output from the demapping section 403, based on the result of channel estimation in the channel estimation section 408.

The PDSCH demodulation section 407 performs demodulation, channel decoding and so on of the downlink data output from the demapping section 403, based on the result of channel estimation in the channel estimation section 408. To be more specific, the PDSCH demodulation section 407 demodulates the PDSCH allocated to the subject user terminal based on the downlink control information demodulated in the PDCCH demodulation section 405 or the enhanced PDCCH demodulation section 406, and acquires the downlink data (downlink user data and higher layer control information) for the subject user terminal.

The channel estimation section 408 performs channel estimation using demodulation downlink reference signals (DM-RSs), measurement downlink reference signals (CRSs and CSI-RSs) and so on. The channel estimation section 408 outputs the result of channel estimation by the measurement downlink reference signals (CRSs and CSI-RSs) to the PDCCH demodulation section 405. The channel estimation section 408 outputs the result of channel estimation by the demodulation downlink reference signals (DM-RSs) to the PDSCH demodulation section 406 and to the enhanced PDCCH demodulation section 407. By means of this demodulation using user terminal 20-specific demodulation downlink reference signals (DM-RSs), it is possible to achieve beam-forming gain with respect to the PDSCH and the enhanced PDCCH.

The received quality measurement section 409 measures the received quality of the downlink reference signals (CRSs, CSI-RSs, DM-RSs and so on) and outputs the measurement results to the RLF determining section 410. The received quality measurement section 409 measures, for example, the SIR, received power and so on as received quality. However, the received quality to be measured in the received quality measurement section 409 is by no means limited to these.

The RLF determining section 410 compares the received quality measured in the received quality measurement section 409 against one or both of conventional thresholds (first criteria) and thresholds that support a new radio resource structure (second criteria). To be more specific, when the first example is employed, the received quality of downlink reference signals is compared against thresholds $Q_{out\_EPDCCH}$ and $Q_{in\_EPDCCH}$ (second criteria). When the second example is employed, the received quality of downlink reference signals is compared against thresholds $Q_{out\_PDCCH}$ and $Q_{in\_PDCCH}$ (first criteria). When the third example is employed, the received quality of downlink reference signals is compared against thresholds $Q_{out\_PDCCH}$ and $Q_{in\_PDCCH}$ (first criteria) or thresholds $Q_{out\_EPDCCH}$ and $Q_{in\_EPDCCH}$ (second criteria), based on report from the radio base station 10.

When the fourth example is employed, the RLF determining section 410 compares the received quality of downlink reference signals against thresholds $Q_{out\_PDCCH}$ and $Q_{in\_PDCCH}$ (first criteria) and thresholds $Q_{out\_EPDCCH}$ and $Q_{in\_EPDCCH}$ (second criteria). When the fifth example is employed, the criteria to use in the comparison are switched based on report from the radio base station 10. To be more specific, in subframes to monitor the UE-specific SSs of the PDCCH, the received quality of downlink reference signals is compared against the thresholds $Q_{out\_PDCCH}$ and $Q_{in\_PDCCH}$ (first criteria). In subframes to monitor the UE-specific SSs of the enhanced PDCCH, the received quality of downlink reference signals is compared against one or both of the first criteria and the second criteria.

If, as a result of such comparisons, "out-of-sync" is detected a predetermined number of times in a row, the RLF determining section 410 starts the timer for judging RLFs. If "in-sync" is detected a predetermined number of times in a row before the timer expires, the timer is cancelled (reset, stopped and so on). If the timer is not canceled and expires, the RLF determining section 410 determines an RLF, and outputs RLF judging information. The user terminal 20 performs various kinds of processes for recovering communication quality based on the RLF judging information. For example, the user terminal 20 stops uplink transmission in order to reduce interference uplink transmission, and starts a re-connection control.

As has been described above, with the radio communication system 1 according to the present embodiment, the received quality measured with downlink reference signals is compared against one or both of conventional thresholds (first criteria) and thresholds that support a new radio resource structure (second criteria), so that it is possible to monitor downlink quality adequately even when a new radio resource structure is employed.

The present invention can be implemented with various corrections and in various modifications, without departing from the spirit and scope of the present invention. That is to say, the descriptions herein are provided only for the purpose of explaining examples, and should by no means be construed to limit the present invention in any way.

The invention claimed is:

1. A radio communication system, which transmits downlink control information from a radio base station to a user terminal by using an enhanced downlink control channel that is frequency-division-multiplexed with a downlink shared data channel, and which also monitors downlink quality based on received quality of a downlink reference signal that is transmitted from the radio base station to the user terminal, wherein:
   the radio base station comprises
   a transmitter that transmits the downlink reference signal to the user terminal;
   the user terminal comprises a processor and a memory; and
   the processor:
   measures received quality of the downlink reference signal transmitted from the radio base station;
   determines a radio link failure on downlink based on the received quality of the downlink reference signal; and
   to monitor downlink quality in the radio communication system, compares received quality of a first downlink reference signal against first criteria that are constituted of two thresholds corresponding to predetermined block error rates of a downlink control channel, compares received quality of a second downlink reference signal against second criteria that are constituted of two thresholds that are different from the two thresholds of the first criteria, and determines the radio link failure based on a result of comparison of the received quality of the first downlink reference signal against the first criteria and a result of comparison of the received quality of the second downlink reference signal against the second criteria.

2. The radio communication system according to claim 1, wherein, when the received quality of the first downlink reference signal falls below a threshold of a lower-level end constituting the first criteria and the received quality of the second downlink reference signal falls below a threshold of a lower-level end constituting the second criteria, the processor starts a timer for judging the radio link failure.

3. The radio communication system according to claim 1, wherein, when the received quality of the first downlink reference signal falls below a threshold of a lower-level end constituting the first criteria or the received quality of the second downlink reference signal falls below a threshold of a lower-level end constituting the second criteria, the processor starts a timer for judging the radio link failure.

4. The radio communication system according to claim 1, wherein, when the received quality of the first downlink reference signal exceeds a threshold of a higher-level end constituting the first criteria and the received quality of the second downlink reference signal exceeds a threshold of a higher-level end constituting the second criteria, the processor cancels a timer for judging the radio link failure.

5. The radio communication system according to claim 1, wherein, when the received quality of the first downlink reference signal exceeds a threshold of a higher-level end constituting the first criteria or the received quality of the second downlink reference signal exceeds a threshold of a higher-level end constituting the second criteria, the processor cancels a timer for judging the radio link failure.

6. The radio communication system according to claim 1, wherein the second criteria are constituted of the two thresholds that correspond to predetermined block error rates of the enhanced downlink control channel.

7. The radio communication system according to claim 1, wherein:
   a threshold of a lower-level end constituting the first criteria is defined as received quality equivalent to a block error rate of the downlink control channel at which downlink cannot be reliably received, and a threshold of a higher-level end constituting the first criteria is defined as received quality equivalent to a block error rate of the downlink control channel at which downlink can be significantly more reliably received; and
   a threshold of a lower-level end constituting the second criteria is defined as received quality equivalent to a block error rate of the enhanced downlink control channel at which downlink cannot be reliably received, and a threshold of a higher-level end constituting the second criteria is defined as received quality equivalent to a block error rate of the enhanced downlink control channel at which downlink can be significantly more reliably received.

8. A user terminal in a radio communication system, to which downlink control information is transmitted from a radio base station by using an enhanced downlink control channel that is frequency-division-multiplexed with a downlink shared data channel, and which also monitors downlink quality based on received quality of a downlink reference signal that is transmitted from the radio base station, the user terminal comprising:
   a processor and a memory;
   wherein the processor:
   measures received quality of the downlink reference signal transmitted from the radio base station;
   determines a radio link failure on downlink based on the received quality of the downlink reference signal; and
   to monitor downlink quality in the radio communication system, compares received quality of a first downlink reference signal against first criteria that are constituted of two thresholds corresponding to predetermined block error rates of a downlink control channel, compares received quality of a second downlink reference signal against second criteria that are constituted of two thresholds that are different from the two thresholds of the first criteria, and determines the radio link failure based on a result of comparison of the received quality of the first downlink reference signal against the first criteria and a result of comparison of the received quality of the second downlink reference signal against the second criteria.

9. A radio communication method to transmit downlink control information from a radio base station to a user terminal in a radio communication system by using an enhanced downlink control channel that is frequency-division-multiplexed with a downlink shared data channel, and to also monitor downlink quality based on received quality of a downlink reference signal that is transmitted from the radio base station to the user terminal, wherein:

the radio base station transmits the downlink reference signal to the user terminal; and the user terminal measures the received quality of the downlink reference signal transmitted from the radio base station, and to monitor downlink quality in the radio communication system, compares received quality of a first downlink reference signal against first criteria that are constituted of two thresholds corresponding to predetermined block error rates of a downlink control channel, compares received quality of a second downlink reference signal against second criteria that are constituted of two thresholds that are different from the two thresholds of the first criteria, and determines a radio link failure based on a result of comparison of the received quality of the first downlink reference signal against the first criteria and a result of comparison of the received quality of the second downlink reference signal against the second criteria.

* * * * *